US007427931B1

(12) United States Patent
Kavaler et al.

(10) Patent No.: US 7,427,931 B1
(45) Date of Patent: Sep. 23, 2008

(54) METHOD AND APPARATUS FOR DETECTING PRESENCE OF VEHICLE USING A MAGNETIC SENSOR EMPLOYING A MAGNETO-RESISTIVE EFFECT

(75) Inventors: Robert Kavaler, Kensington, CA (US); Karric Kwong, Vallejo, CA (US)

(73) Assignee: Sensys Networks, Inc., Berkeley, CA (US)

( * ) Notice: Subject to any disclaimer, the term of this patent is extended or adjusted under 35 U.S.C. 154(b) by 0 days.

(21) Appl. No.: 11/693,396

(22) Filed: Mar. 29, 2007

(51) Int. Cl.
*G08G 1/01* (2006.01)
*B60Q 1/00* (2006.01)

(52) U.S. Cl. ........................ 340/941; 340/933; 340/928

(58) Field of Classification Search ................. 340/941, 340/933
See application file for complete search history.

(56) References Cited

U.S. PATENT DOCUMENTS

| | | | | |
|---|---|---|---|---|
| 5,491,475 | A * | 2/1996 | Rouse et al. | 340/933 |
| 6,016,109 | A * | 1/2000 | Yosida et al. | 340/941 |
| 6,208,268 | B1 * | 3/2001 | Scarzello et al. | 340/941 |
| 2002/0145541 | A1 * | 10/2002 | Matsui et al. | 340/934 |

* cited by examiner

*Primary Examiner*—Donnie L Crosland
(74) *Attorney, Agent, or Firm*—Earle Jennings

(57) ABSTRACT

Method using raw signal from magneto-resistive sensor through the use of recent variance (RV) of raw signal (RS) for first-capture of first time RV crosses variance detect, second-capture start enable for first time when RS crosses above raw detect and RV above variance detect, third-capture ending time when RS crosses below raw undetect and RV below variance undetect. Starting and ending times are products of the process, often used for traffic flow counts. Apparatus supporting this method as a processor and/or a vehicular sensor node.

18 Claims, 11 Drawing Sheets

Fig. 4A
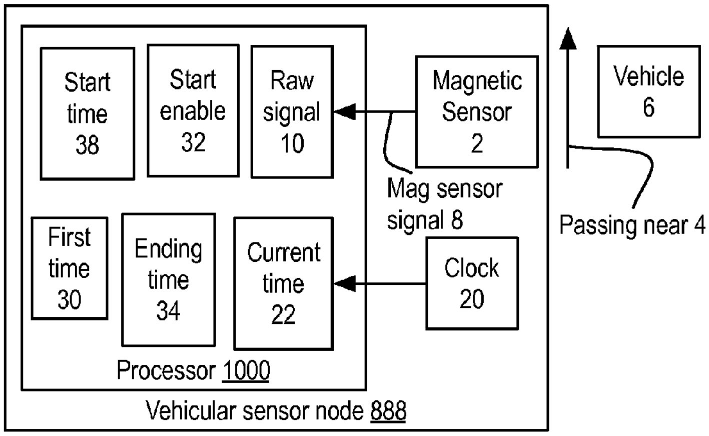
Fig. 4B
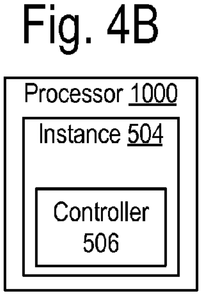
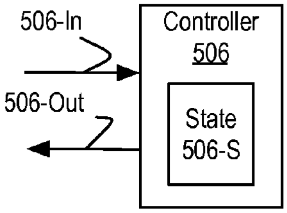
Fig. 4C
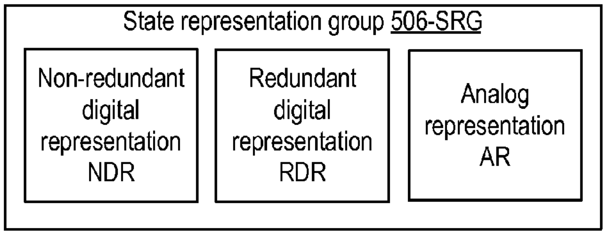
Fig. 4D
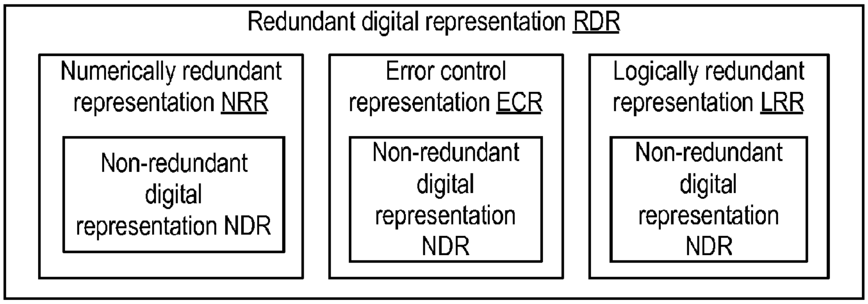
Fig. 4E Fig. 9A
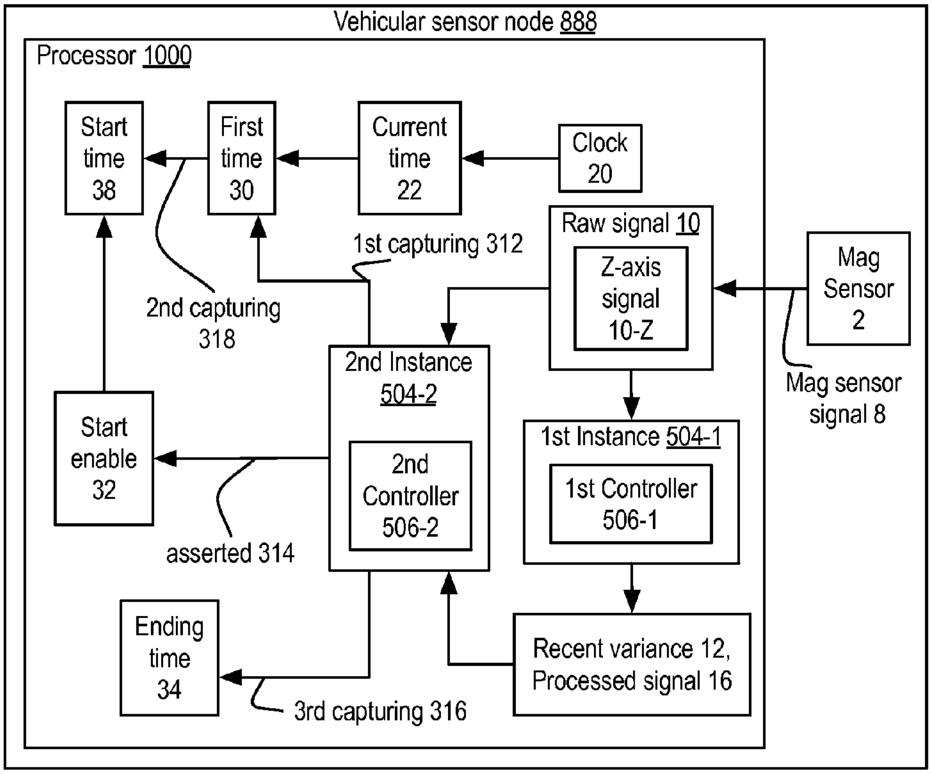
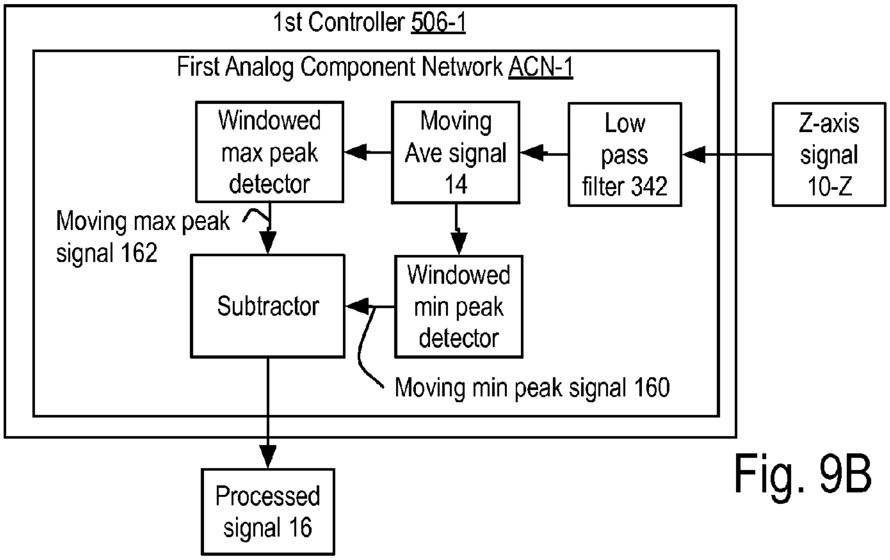
Fig. 9B

METHOD AND APPARATUS FOR DETECTING PRESENCE OF VEHICLE USING A MAGNETIC SENSOR EMPLOYING A MAGNETO-RESISTIVE EFFECT

TECHNICAL FIELD

This invention relates using a magnetic sensor to detect the presence of a vehicle, in particular, to generating a processed signal from the magnetic sensor signal which has far lower noise and using both the processed signal and the magnetic sensor signal to detect the vehicle's presence, where the magnetic sensor is a magneto-resistive sensor.

BACKGROUND OF THE INVENTION

There are two common ways to magnetically detect the presence of a vehicle. The first way uses what is known as a loop sensor, which inductively couples with the vehicle as it passes near the loop sensor, producing an induced current in the electrical loop. This induced current is measured, possibly after being amplified. Detection of vehicular motion proceeds by analyzing this measured signal from the loop sensor. The second way uses a magneto-resistive sensor, whose internal resistance changes due to fluctuations in the magnetic field it experiences. Often the resistance is determined by measuring a voltage drop across the sensor. These measurements are used to determine the starting and ending time for a vehicle passing near the magnetic sensor. The signals from these sensors vary greatly, making determining the starting and ending times very erratic. Typically these measured signals are analyzed in terms of their rate of change, which often worsens the effect of noise.

What is needed is a method and supporting apparatus, which can use the raw signal from a magneto-resistive sensor to reliably capture the start time and the ending time for a vehicle passing near the magnetic sensor.

SUMMARY OF THE INVENTION

Embodiments of the invention includes a method for analyzing the passage of a vehicle near a magnetic sensor by using a raw signal received as a magnetic sensor signal from the magnetic sensor to create a start time and an ending time for the vehicle passing near the magnetic sensor, which further includes the following:

- A first time is first captured from the current time when the recent variance of the raw signal goes above a variance detect.
- The start enable is asserted when the raw signal goes above a raw detect and said recent variance of said raw threshold is above said variance detect.
- The start time is second captured from the first time when the assertion of the start enable begins.
- The ending time is third captured from the current time when both a first condition and a second condition become true, where the first condition is that the recent variance of the raw signal is below a variance undetect and the second condition is that the raw signal is below a raw undetect.
- The variance detect may preferably be above the variance undetect, and the raw detect may preferably be above the raw undetect.
- The magnetic sensor is preferably a magneto-resistive sensor.

By using the recent variance of the raw signal to determine when to capture the first time, start enable and/or the ending time, this method has shown greatly improved reliability by being much less sensitive to noise.

Generating the start time may further include the start enable generated from the current time when the raw signal goes above the raw detect and the recent variance of the raw signal is below the variance undetect.

Using the raw signal may include at least one of the following:

- Amplifying the magnetic sensor signal received from the magnetic sensor to create an amplified signal for generating the raw signal.
- Digitizing the magnetic sensor signal with a first analog-to-digital converter to create the raw signal from a digitized signal.
- And digitizing the amplified signal with a second analog-to-digital converter to create the raw signal from a second digitized signal.

Embodiments of the invention include a vehicular sensor node implementing this method by including a processor using the raw signal received at least in part through the communicative coupling to the magnetic sensor to create the start enable and the ending time for the vehicle passing near the magnetic sensor.

The processor may include at least one instance of at least one controller, where each controller receives at least one input, maintains and updates at least one state and generates at least one output based upon at least one of the inputs and/or the value of at least one of the states.

The controller may include at least one instance of at least one of the following: A finite state machine FSM. An inferential engine IE. A neural network NN. An analog component network. A computer directed by a program system and accessibly coupled to a memory. The program system includes at least one program step, residing in the memory. As used herein, a computer includes at least one data processor and at least one instruction processor, where each of the data processor is directed by at least one of the instruction processors.

The recent variance of said raw signal may preferably be a variance of said raw signal over a first time-window for first capturing said first time and said start enable and the recent variance of said raw signal may further be said variance of said raw signal over a second time-window for capturing said ending time.

The raw signal may preferably include the following: An X-axis signal. A Z-axis signal. And a Y-axis signal 10-Y.

- In certain embodiments, the raw signal may include the length of the vector formed of the X-axis signal, the Y-axis signal and the Z-axis signal.
- The recent variance of the raw signal may include the variance from the recent average of the length.
- The variance from the recent average may include the sum of the square of the difference between the length and average length.
- The variance may further include the square root of that sum.
- The variance may further include dividing by the number of samples or the length of recent time within a time-window.

In other embodiments, the raw signal 10 may be approximated by the Z-axis signal 10-Z as follows:

- First capturing the first time may further include first determining the first time when the variance of the first time-window of the Z-axis signal is above the variance detect.
- Third capturing the ending time may further include second determining said ending time when said variance of said second time-window of said Z-axis signal crossing below said variance undetect while said Z-axis signal is below said raw undetect in said second time-window to create said ending time.

The method may further include the:

Averaging said Z-axis signal to create a moving average signal.

Using said moving average signal to create a moving minimum peak signal and a moving maximum peak signal.

And subtracting the moving minimum peak signal from the moving maximum peak signal to create a processed signal.

First capturing the first time may further include first determining the first time when the processed signal crosses above the variance detect while the Z-axis signal is above the raw detect in the first time-window.

Third capturing the ending time may further include second determining the ending time when the processed signal crosses below the variance undetect while the Z-axis is below the raw undetect in the second time-window.

Averaging the Z axis signal may further include at least one of the following:

Averaging said Z-axis signal over a succession of time windows to create said moving average signal.

Low pass filtering said Z-axis signal with a time constant less than one second to create said moving average signal.

And weighted averaging using a finite impulse response filter of said Z-axis signal to create said moving average signal.

The time windows may be a succession of non-overlapping time windows.

Alternatively, the time windows in the succession of time windows may all be of approximately the same length.

Averaging the Z-axis signal over a succession of time windows may further include averaging at least one sample of the Z-axis signal from at least two of the succession of the time windows.

Alternative implementations of the processor and the vehicular sensor node may have any combination of the following properties:

There may be no program system to direct activities.

The clock may not be included in the processor and may further not be included in the vehicular sensor node in certain embodiments.

The magnetic sensor may not be included in the processor and may further not be included in the vehicular sensor node in certain embodiments.

It should be noted that most of the clock is often, preferably included in the processor. Often, only a crystal and/or one or more passive components are not included in the processor.

It should be further noted that in many situations, the clock and the magnetic sensor are preferably included in the vehicular sensor node.

The processor may further include more than one instance of one controller. An instance of a controller may include another instance of another controller.

By way of example, the processor may include a first instance of an analog circuit network providing the recent variance and/or processed signal to a second instance of a second controller.

The second controller may include a delay aligner of the raw signal and/or the Z-axis signal whose output may be provided with the recent variance and/or processed signal to a comparator which may generate any combination of the four conditions used by a third instance of a third controller.

The third controller may preferably be a finite state machine driving the first capturing, generating and third capturing of the first time, the start enable and the ending time, respectively.

BRIEF DESCRIPTION OF THE DRAWINGS

FIG. 4A shows a vehicular sensor node including the processor of FIGS. 1A to 1D, the magnetic sensor, and the clock;

FIG. 4B shows the processor including at least one instance of a controller;

FIG. 4C shows the controller receiving at least one input, maintaining and/or updating the value of at least one state and generating at least one output based upon at least one of the inputs and/or the value of at least one of the states;

FIG. 4D shows the representations of the value of at least one of the states may include at least one member of the state representation group consisting of: a non-redundant digital representation, a redundant digital representation, and an analog representation;

FIG. 4E shows that the redundant digital representation of a non-redundant digital representation of FIG. 4D may include a numerically redundant representation, an error control representation and a logically redundant representation;

FIG. 9A shows an example of the vehicular sensor node including the processor and the magnetic sensor, with the processor including the clock, a first instance of a first controller and a second instance of a second controller;

FIG. 9B shows the first controller of FIG. 9A as a first analog component network;

DETAILED DESCRIPTION

Figure 1A:
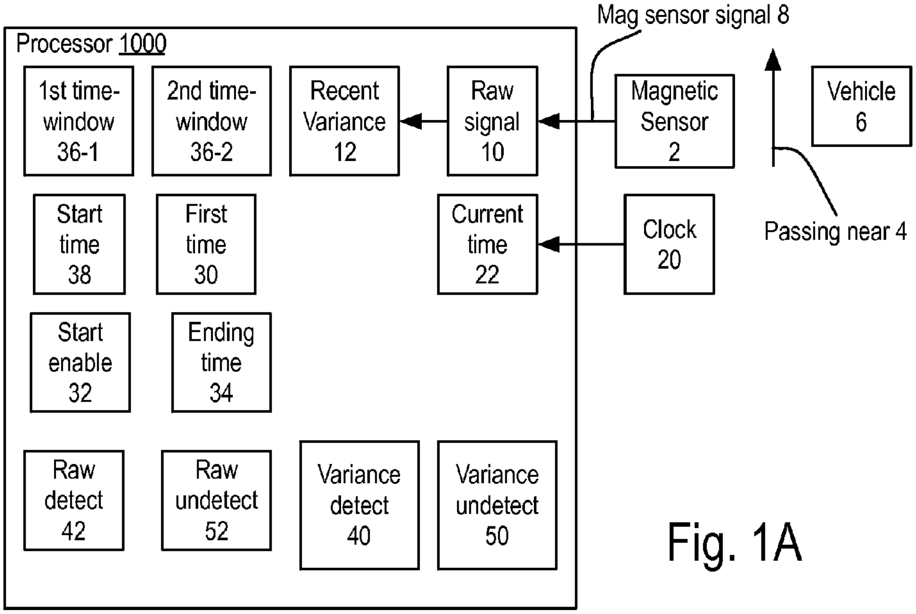
FIG. 1A shows a processor implementing the method of using a raw signal from a magneto-resistive sensor and a clock to create start enable and an ending time measuring a vehicle passing near the magnetic sensor.

This invention relates using a magnetic sensor to detect the presence of a vehicle, in particular, to generating a processed signal from the magnetic sensor signal which has far lower noise and using both the processed signal and the magnetic sensor signal to detect the vehicle's presence, where the magnetic sensor is a magneto-resistive sensor.

Embodiments of the invention include a method for analyzing the passage of a vehicle near a magnetic sensor by using a raw signal 10 received as a magnetic sensor signal 8 from the magnetic sensor 2 to create a start enable 32 and an ending time 34 for the vehicle 6 passing near 4 the magnetic sensor 2, as shown in FIGS. 1A, 2, 6A, 6B, 8B and 9A which further includes the following:

- A first time 30 is first captured 312 from the current time 22 when the recent variance 12 of the raw signal 10 goes above a variance detect 40.
- The start enable 32 is asserted 314 when the raw signal goes above a raw detect 42 and said recent variance 12 of said raw threshold is above said variance detect 40.
- The start time 38 is second captured 316 from the first time 30 when the assertion of the start enable 32 begins.
- The ending time 34 is third captured 318 from the current time 22 when both a first condition and a second condition become true, where the first condition is that the recent variance 12 of the raw signal 10 is below a variance undetect 50 and the second condition is that the raw signal 10 is below a raw undetect 52.
- The variance detect 40 may preferably be above the variance undetect 50, and the raw detect 42 may preferably be above the raw undetect 52.
- The magnetic sensor 2 is preferably a magneto-resistive sensor.

By using the recent variance of the raw signal to determine when to capture the first time, start enable and/or the ending time, this method has shown greatly improved reliability by being much less sensitive to noise.

Asserting 314 the start enable 32 may further include the start enable generated from the current time 22 when the raw signal 10 goes above the raw detect and the recent variance 12 of the raw signal is below the variance undetect 50.

Figure 1B:
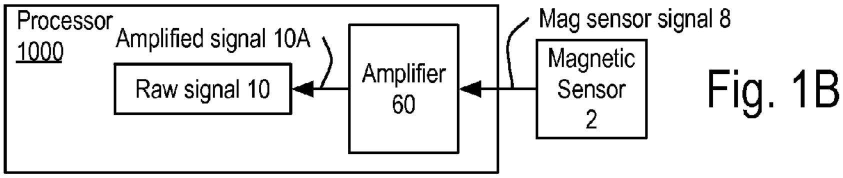
FIG. 1B shows the magnetic sensor signal being amplified to at least partly create the raw signal of FIG. 1A.
Figure 1C:
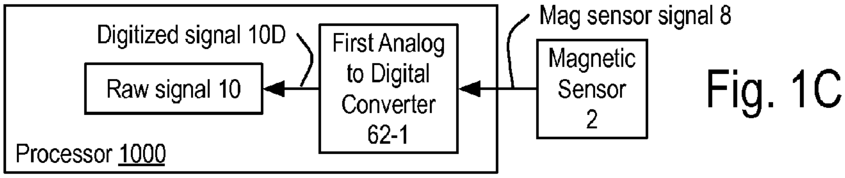
FIG. 1C shows the magnetic sensor signal being digitized to at least partly create the raw signal of FIG. 1A.
Figure 1D:
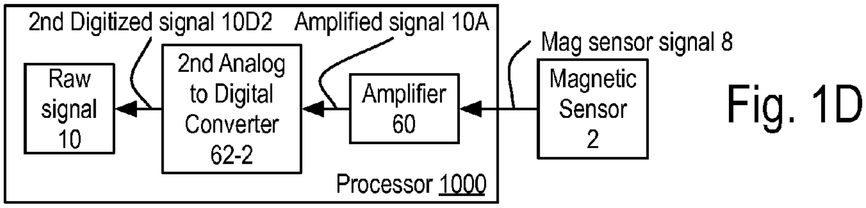
FIG. 1D shows the magnetic sensor signal being amplified and digitized to at least partly create the raw signal of FIG. 1A.
Figure 2A:
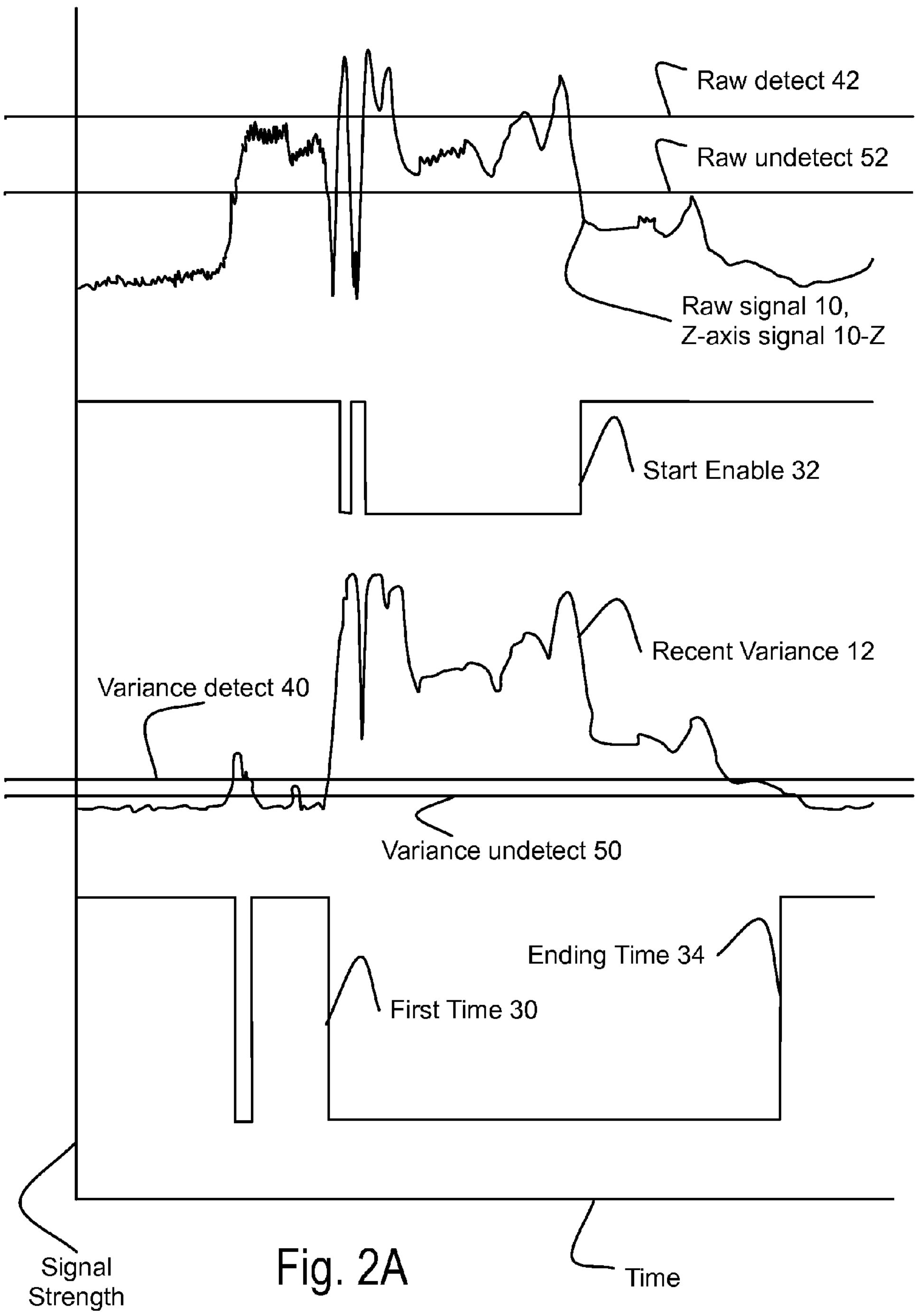
FIGS. 2A and 2B show examples of the raw signal, the recent variance of the raw signal, the first capturing of the first time from the current time based upon the clock of FIG. 1A, the generating of the start enable for the first time, and the third capturing of the ending time from the current time.
Figure 2B:
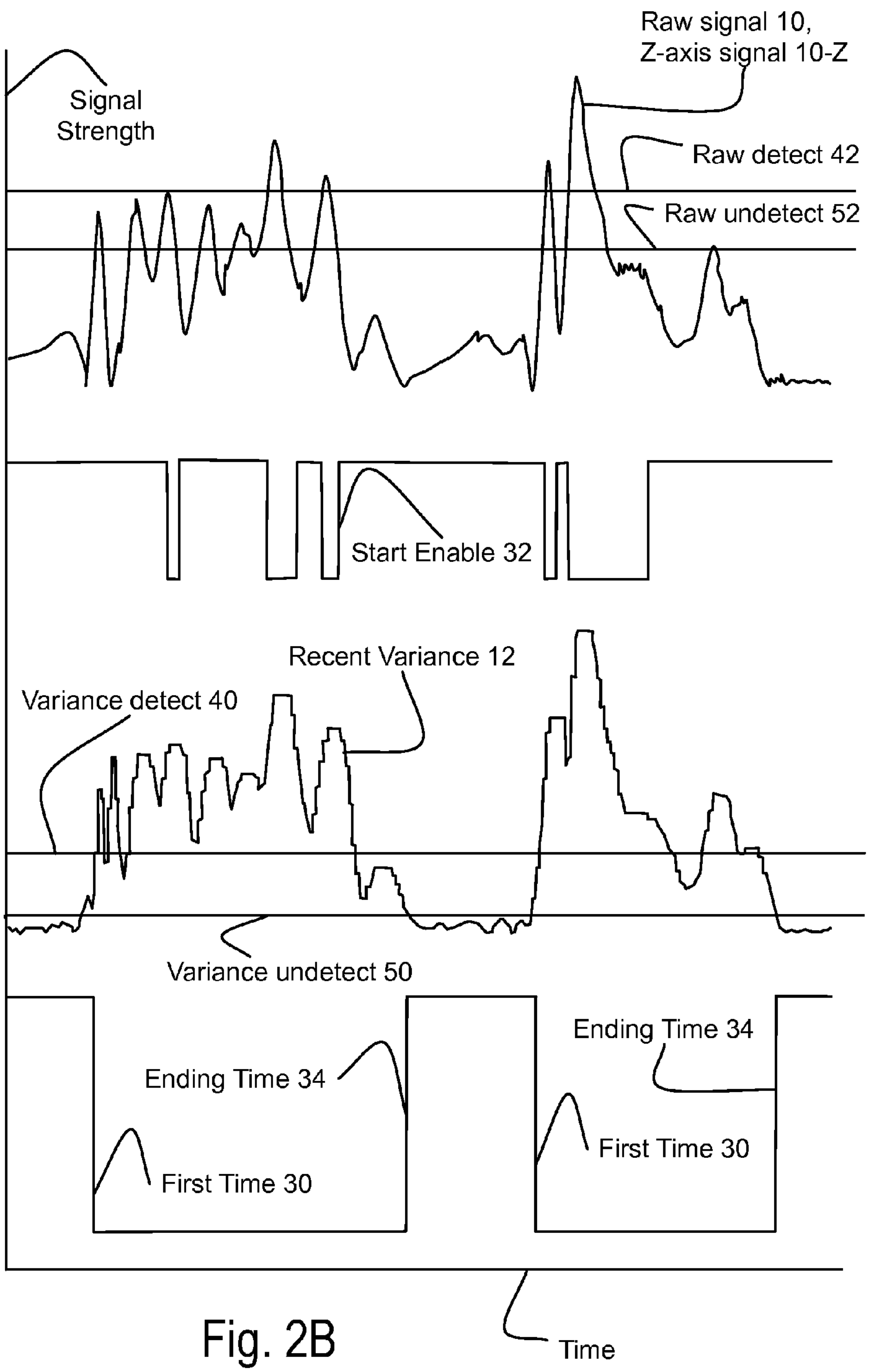

Using the raw signal 10 may include at least one of the following:

- Amplifying 60 the magnetic sensor signal 8 received from the magnetic sensor 2 to create an amplified signal 10A for generating the raw signal 10, as shown in FIGS. 1B and 1D.
- Digitizing the magnetic sensor signal 8 with a first analog-to-digital converter 62-1 to create the raw signal 10 from a digitized signal 10D, as shown in FIG. 1C.
- And digitizing the amplified signal 10A with a second analog-to-digital converter 62-2 to create the raw signal 10 from a second digitized signal 10D2.

Embodiments of the invention include a vehicular sensor node 888 implementing this method by including a processor 1000 using the raw signal 10 received at least in part through the communicative coupling 24 to the magnetic sensor 2 to create the start enable 32 and the ending time 34 for the vehicle 6 passing near 4 the magnetic sensor as shown in FIGS. 1A and 4A.

The processor 1000 may include at least one instance 504 of at least one controller 506 as shown in FIG. 4B, where each controller receives at least one input 506-In, maintains and updates at least one state 506-S and generates at least one output 506-Out based upon at least one of the inputs and/or the value of at least one of the states.

- The value of at least one state 506-S may include at least one of the following: a non-redundant digital representation NDR, a redundant digital representation RDR and/or an analog representation AR, which will be referred to as the members of the state representation group 506-SRG as shown in FIG. 4D.
- A non-redundant digital representation NDR frequently comprises at least one digit, which may frequently represent a bit with values of 0 and 1, a byte including eight bits, and so on. Often non-redundant digital representations include representations of 16 bit integers, 32 bit integers, 16 bit floating point numbers, 32 bit floating point numbers, 64 bit floating point numbers, strings of bytes, fixed length buffers of bytes, integers, First-In-First-Out (FIFO) queues of such representations, and so on. Any, all and more than just these examples may be used as non-redundant digital representations of the state of a controller.

The redundant digital representation RDR of a non-redundant digital representation NDR may include at least one of the following: a numerically redundant digital representation NRR, a logically redundant representation LRR and an error control representation ECR as shown in FIG. 4E. The following examples will serve to illustrate these redundant representations:

- An example of a numerically redundant representation NRR may be found in a standard multiplier, which will often use a local carry propagate adder to add three or four numbers together to generate two numeric components which redundantly represent the numeric result of the addition.
- An example of an error control representation ECR will frequently use the non-redundant digital representation and an additional component formed as the function of the non-redundant digital representation. If this error control representation is altered by a few bits, an error correcting function reconstructs the original non-redundant digital representation. Quantum computers are considered as controllers, which will tend to use this kind of error control representations for at least some states.
- An example of a logically redundant representation LRR may be found in the definition and implementation of many finite state machines, which often require that a single state be represented by any member of a multi-element set of non-redundant digital representation. Often the members of this set differ from at least one other member of the set by just one bit. Such logically redundant representations are often used to insure that the generation of glitches is minimized.

Figure 5A:
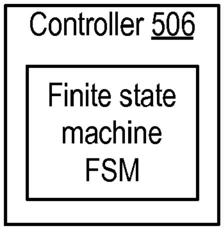
FIG. 5A shows the controller including at least one instance of a finite state machine.

The controller 506 may include at least one instance of at least one of the following:

A finite state machine FSM, as shown in FIG. 5A.

Figure 5B:
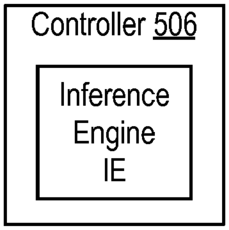
FIG. 5B shows the controller including at least one instance of an inference engine.

An inferential engine IE as shown in FIG. 5B

Figure 5C:
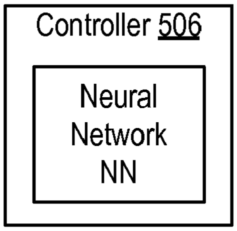
FIG. 5C shows the controller including at least one instance of a neural network.

A neural network NN as shown in FIG. 5C.

Figure 5D:
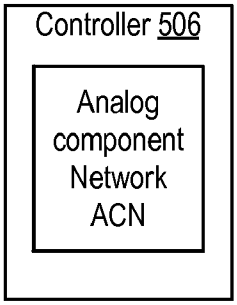
FIG. 5D shows the controller including at least one instance of a computer accessibly coupled to a memory and directed by a program system residing in the memory.

An analog component network as shown in FIG. 5D.

Figure 5E:
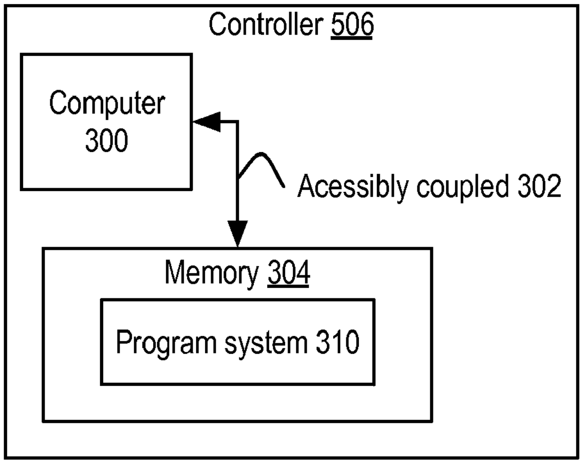
FIG. 5E shows an embodiment of the vehicular sensor and processor including the computer implementing at least part of at least one of the steps of the method through the program steps shown in the flowcharts of FIGS. 6A to 8A.

A computer 300 directed by a program system 310 and accessibly coupled 302 to a memory 304 as shown in FIG. 5E.

The program system 310 includes at least one program step, residing in the memory. As used herein, a computer 300 includes at least one data processor and at least one instruction processor, where each of the data processor is directed by at least one of the instruction processors.

By way of example, a refinement shown in FIG. 6A of the computer 300 of FIG. 5E may further implement this method as follows:

The clock 20 may be second communicatively coupled 24-2 to the computer, and through their interaction the current time 22 may be created and reside in the memory 304.

The magnetic sensor 2 may provide the magnetic sensor signal 8 to the computer to create the raw signal 10. The raw signal is used to create the recent variance 12, possibly using the first time window 36-1 and/or the second time window 36-2, any combination of which may reside in the memory 304.

The program system 310, in implementing the method, uses the raw signal 10 and the recent variance 12 to create the start enable 32 and the ending time 34 of the vehicle 6 passing near 4 the magnetic sensor 2.

In what follows, at least one flowchart will be shown to illustrate an example of at least some aspects of this method. The operation of starting a flowchart refers to at least one of the following and is denoted by an oval with the text “Start” in it:

Entering a subroutine in a macro instruction sequence in a computer 300.

Entering into a deeper node of an inferential graph of an inference engine IE.

Directing a state transition in a finite state machine FSM, possibly while pushing a return state.

And triggering at least one neuron in a neural network NN.

The operation of termination in a flowchart refers to at least one of the following and is denoted by an oval with the text “Exit” in it:

The completion of those steps, which may result in a subroutine return in the computer 300.

Traversal of a higher node in an inferential graph of the inference engine IE.

Popping of a previously stored state in the finite state machine FSM.

Return to dormancy of the firing neurons of the neural network NN.

An operation in a flowchart refers to at least one of the following:

The instruction processor responds to the step as a program step to control the data execution unit in at least partly implementing the step within the computer 300.

The inference engine IE responds to the step as nodes and transitions within an inferential graph based upon and modifying a inference database in at least partly implementing the step.

The neural network NN responds to the step as stimulus in at least partly implementing the step.

The finite state machine FSM responds to the step as at least one member of a finite state collection comprising a state and a state transition, implementing at least part of the step.

Figure 6A:
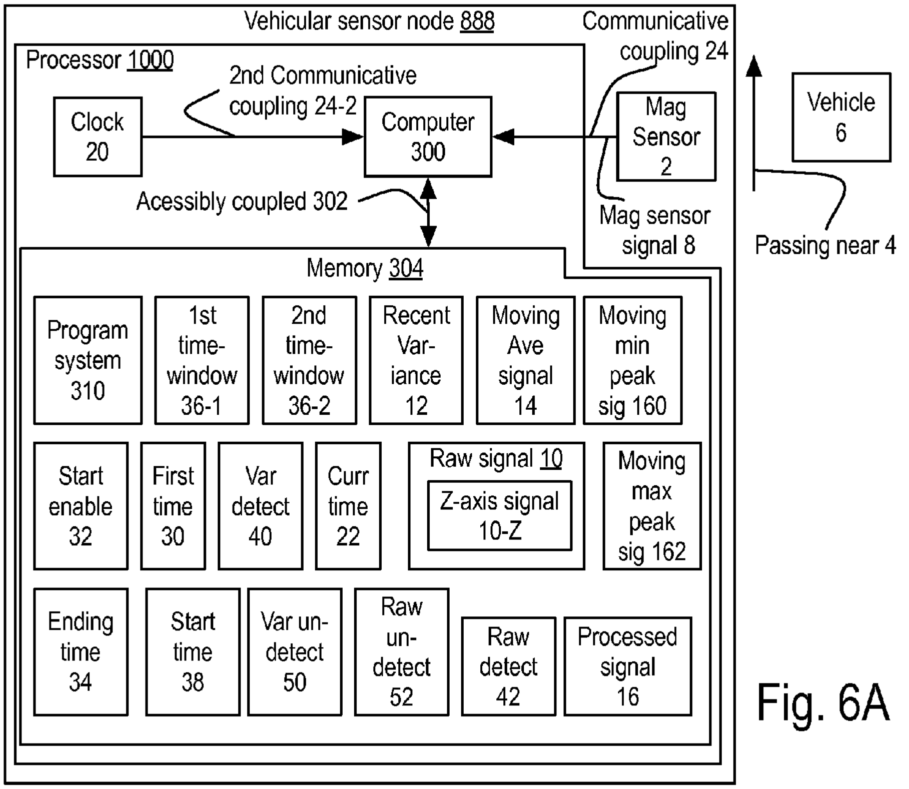
Figure 6B:
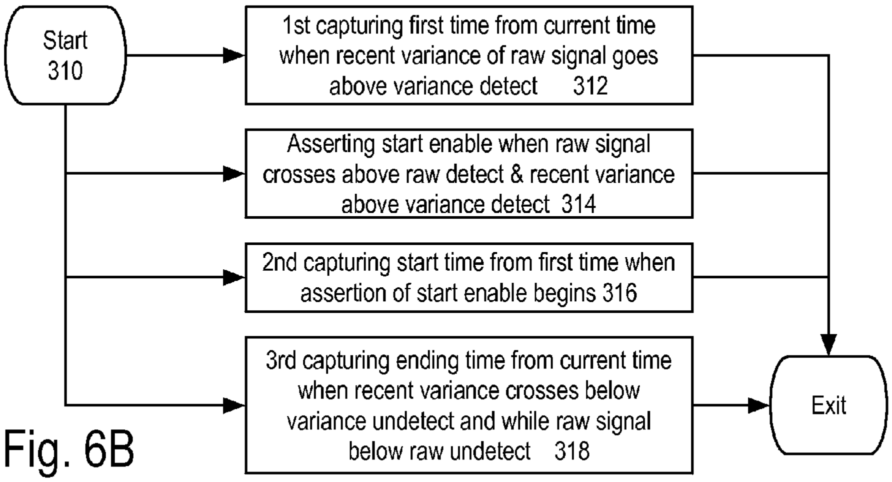

By way of example, FIG. 6B shows a flowchart of the program system 310 of FIGS. 5E and 6A, which may preferably, at least partly in certain embodiments, implements the method of creating the start enable 32 and ending time 34 for the vehicle 6 passing near 4 the magnetic sensor 2. The steps of the method are supported by at least one of the following:

First capturing 312 the first time 30 from the current time 22 provided by the clock 20, when the recent variance 12 of the raw signal 10 crosses above a variance detect 40.

Asserting 314 the start enable 32 for first time 30 when said raw signal 10 crosses above a raw detect 42 and said recent variance 12 of said raw signal is above said variance detect 40.

Third capturing 318 said ending time 34 from said current time 22 when said recent variance 12 of said raw signal 10 crosses below a variance undetect 50 while said raw signal 10 is below a raw undetect 52.

As used herein, any of the following may be included as a literal constant linked to the program system 31 in certain embodiments, whereas in others, they may be entities residing in the memory 304, which can be read, and in some cases can be written: raw detect 42, the raw undetect 52, the variance detect 40 and the variance undetect 50.

The recent variance 12 of said raw signal 10 may preferably be a variance of said raw signal over a first time-window 32-1 for first capturing 312 said first time 30 and said start enable 32 and the recent variance of said raw signal may further be said variance of said raw signal over a second time-window 36-2 for capturing said ending time 34.

The first time-window 36-1 may be essentially the same time duration as the second time-window 36-2 in certain embodiments and in others, they may be essentially different.

In certain embodiments, the raw signal 10 may be sampled approximately 128 times per second, with the first time-window 36-1 and the second time-window 36-2 may preferably include at least four successive samples. In certain embodiments, it may be preferred that these time-windows be eight, sixteen and/or thirty two successive time samples.

Figure 3A:
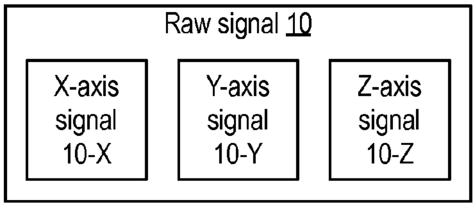
FIGS. 3A and 3B show the raw signal including an X-axis signal related to the X-direction, the Y-axis signal related to the Y-direction, and the Z-axis signal related to the Z-direction of the vehicle passing near the magnetic sensor on pavement.
Figure 3B:
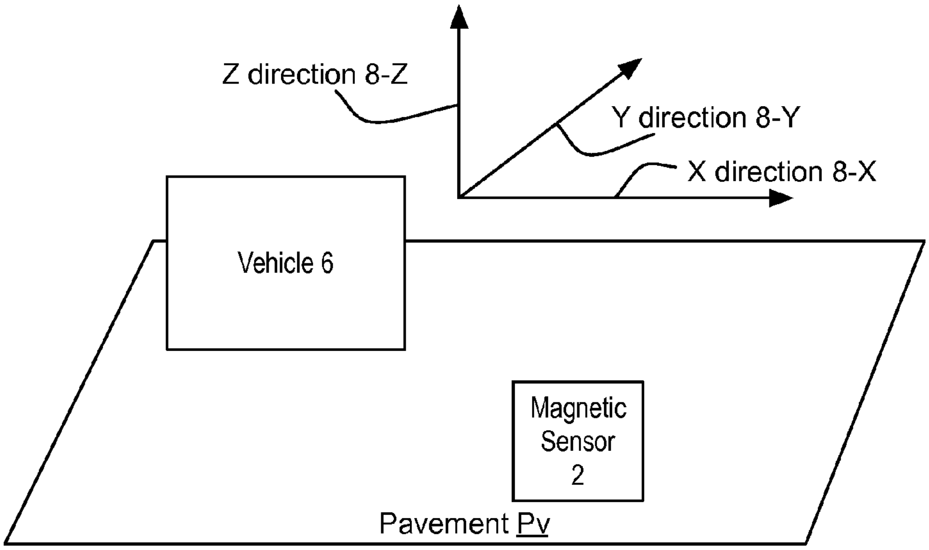

The raw signal 10 may preferably include the following:

An X-axis signal 10-X in a predominant direction of the flow for the vehicle’s motion, which will be referred to herein as the X direction 8-X as shown in FIGS. 3A and 3B.

A Z-axis signal 10-Z in a direction perpendicular to a pavement Pv the vehicle 6 moves on, which will be referred to herein as the Z direction 8-Z.

And a Y-axis signal 10-Y in the direction perpendicular to the predominant direction in the plane of the pavement, which will be referred to herein as the Y direction 8-Y.

Figure 3C:
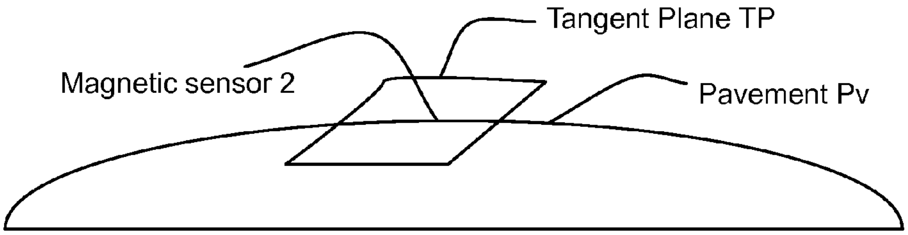
FIG. 3C shows the use of the tangent plane of the pavement near the magnetic sensor for use in determining the X-direction, Y-direction and Z-direction when the pavement is curved.

While the pavement Pv may be essentially flat in the vicinity of the magnetic sensor 2 as shown in FIG. 3B, in other alternative embodiments, the pavement may not be flat, in which case the plane of the pavement will approximate the tangent plane Tp of the pavement in the vicinity of the magnetic sensor, as shown in FIG. 3C.

Figure 7A:
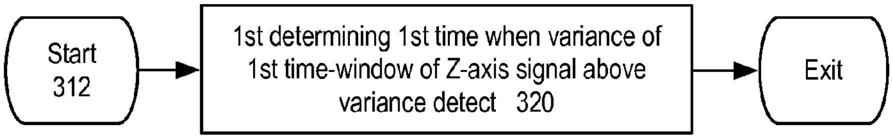

First capturing 312 the first time 30 may further include first determining 320 the first time when the variance of the first time-window of the Z-axis signal 10-Z is above the variance detect 40 as shown in FIG. 7A.

Figure 7B:
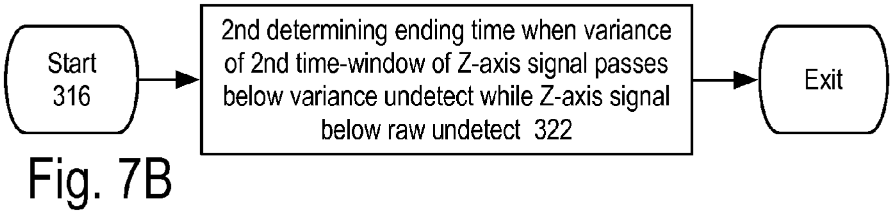

Third capturing 318 the ending time 34 may further include second determining 322 said ending time 34 when said variance of said second time-window 36-2 of said Z-axis signal 10-Z crossing below said variance undetect 50 while said Z-axis signal is below said raw undetect 52 in said second time-window to create said ending time as shown in FIG. 7B.

Figure 7C:
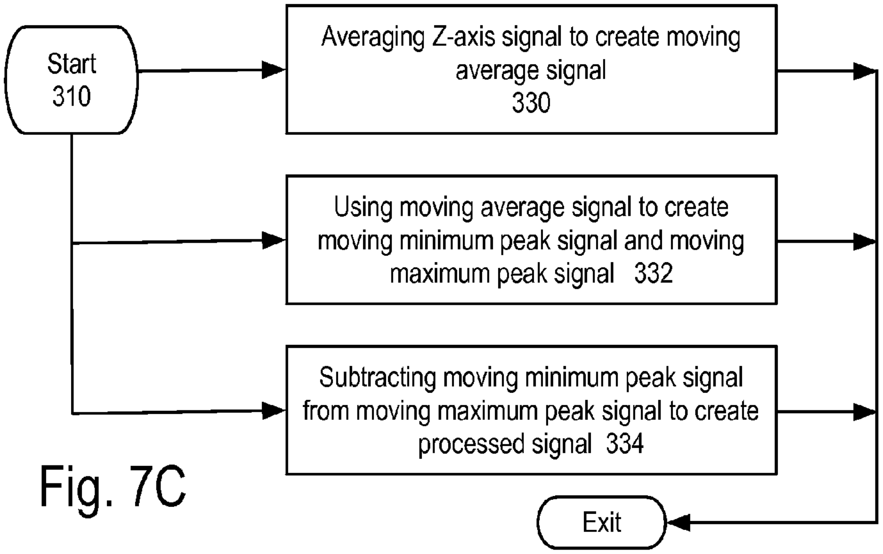

The method illustrated through the example implementation of the program system 310 may further include the following as shown in the flowchart of FIG. 7C and the block diagram of FIG. 6A:

Averaging 330 said Z-axis signal 10-Z to create a moving average signal 14.

Using 332 said moving average signal to create a moving minimum peak signal 160 and a moving maximum peak signal 162.

And subtracting 334 the moving minimum peak signal from the moving maximum peak signal to create a processed signal 16.

First capturing 310 the first time 30 may further include first determining 320 the first time when the processed signal 16 crosses above the variance detect 40 while the Z-axis signal 10-Z is above the raw detect 42 in the first time-window 36-1.

Third capturing 318 the ending time may further include second determining 322 the ending time 34 when the processed signal 16 crosses below the variance undetect 50 while the Z-axis 10-Z is below the raw undetect 52 in the second time-window 36-2.

Figure 8A:
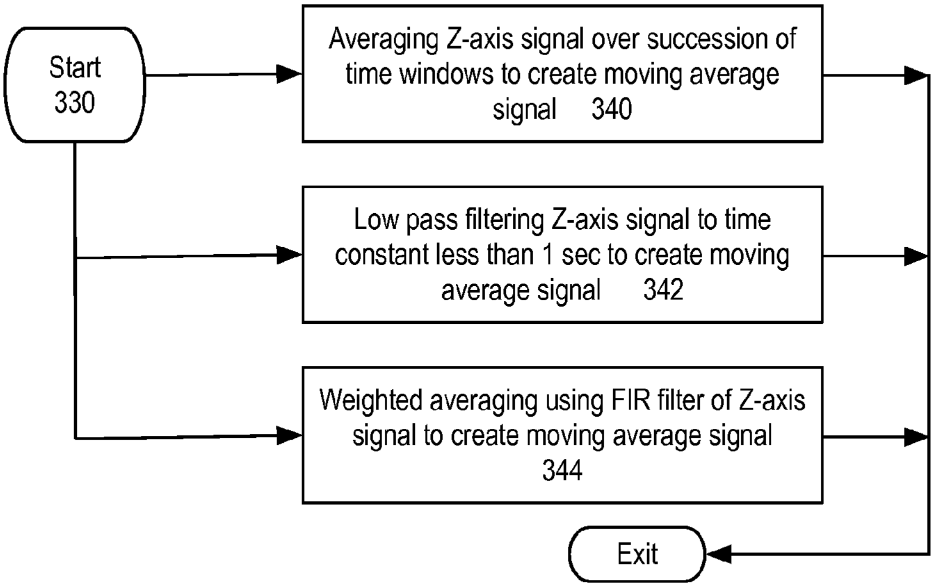
FIG. 8B shows an example of the vehicular sensor node not including the clock and not including the magnetic sensor.

Averaging 330 the Z axis signal 10-Z may further include at least one of the following as shown in the flowchart of FIG. 8A:

Averaging 340 said Z-axis signal over a succession of time windows 36 to create said moving average signal 14.

Low pass filtering 342 said Z-axis signal with a time constant less than one second to create said moving average signal.

And weighted averaging using a finite impulse response filter of said Z-axis signal to create said moving average signal.

The time windows may be a succession of non-overlapping time windows.

Alternatively, the time windows in the succession of time windows may all be of approximately the same length.

Averaging the Z-axis signal over a succession of time windows may further include averaging at least one sample of the Z-axis signal from at least two of the succession of the time windows.

Figure 8B:
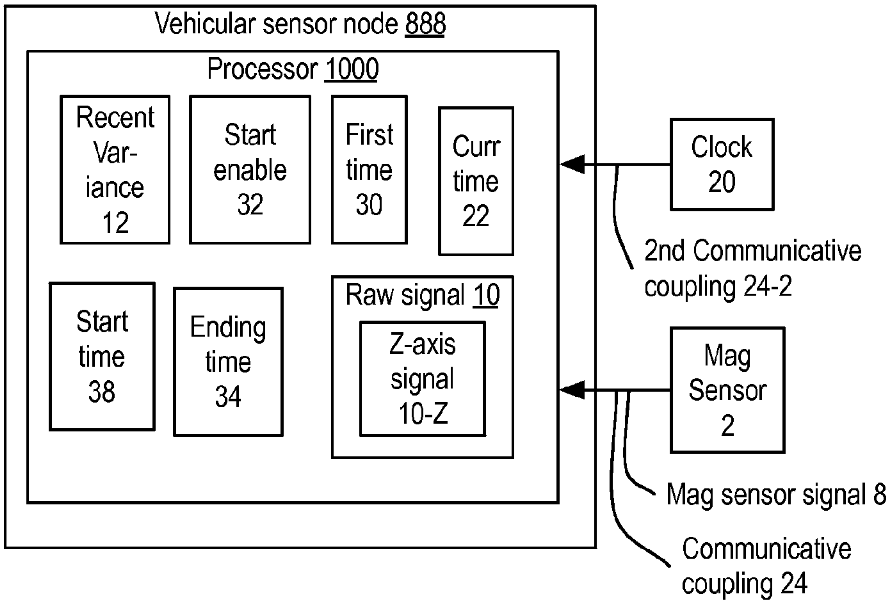

Now consider some examples of alternative implementations of the processor 1000 and the vehicular sensor node 888 as shown in FIG. 8B:

There may be no program system 310 to direct activities, as has been shown in FIGS. 5E and 6A.

The clock 20 may not be included in the processor and may further not be included in the vehicular sensor node in certain embodiments.

The magnetic sensor 2 may not be included in the processor and may further not be included in the vehicular sensor node in certain embodiments.

It should be noted that most of the clock is often, preferably included in the processor. Often, only a crystal and/or one or more passive components are not included in the processor.

It should be further noted that in many situations, the clock and the magnetic sensor are preferably included in the vehicular sensor node.

The processor 1000 may further include more than one instance of one controller. An instance of a controller may include another instance of another controller.

By way of example, the processor may include a first instance of an analog circuit network providing the recent variance and/or processed signal to a second instance of a second controller.

The second controller may include a delay aligner of the raw signal and/or the Z-axis signal whose output may be provided with the recent variance and/or processed signal to a comparator which may generate any combination of the four conditions used by a third instance of a third controller.

The third controller may preferably be a finite state machine driving the first capturing, generating and third capturing of the first time, the start enable and the ending time, respectively.

The processor 1000 of FIG. 8B may further include more than one instance 504 of one controller 506, for example, as shown in FIG. 9A, the processor may include a first instance 504-1 of a first controller 506-1 and a second instance 504-2 of a second controller 506-2, which may operate as follows:

The first instance 506-1 may receive the raw signal 10, preferably in certain implementations, the Z-axis signal 10-Z to create the recent variance signal 12 of FIG. 8B, further preferred, the processed signal 16 of FIG. 9A.

The second instance 506-2 may receive the raw signal 10 and/or the Z-axis signal 10-Z as well as at least one of the recent variance signal 12 and/or processed signal 16 to control the contents of the first time 30, the start enable 32 and the ending time 34 through the signals for first capturing 312, asserting 314 and third capturing 318.

Figure 10A:
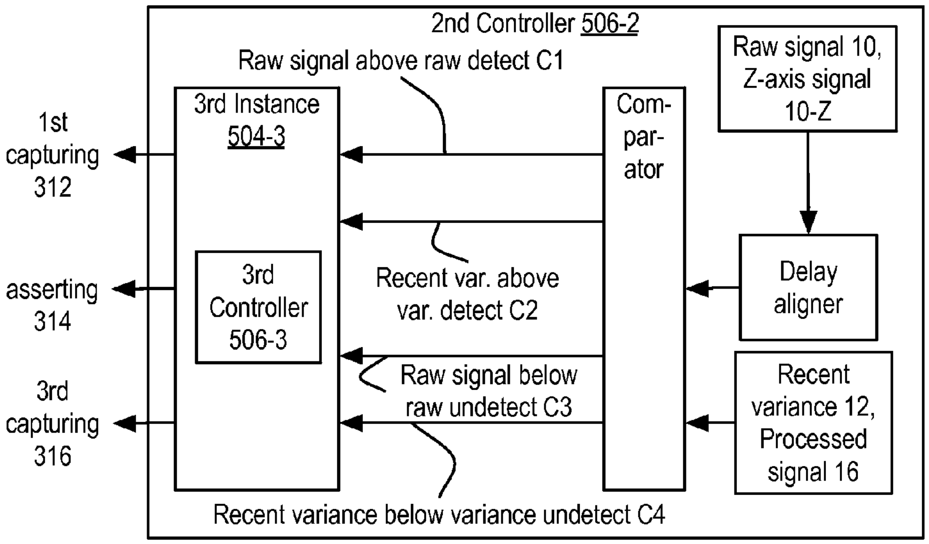
FIG. 10A shows the second controller of FIG. 9A including a third instance of a third controller generating the first capturing for the first time used in FIG. 9A, the generating for the start enable, and the third capturing for the ending time of the vehicle passing near the magnetic sensor.

FIG. 10A shows an example of the second controller 506-2 may in certain embodiments include a delay aligner for the raw signal 10 and/or the Z-axis signal 10-Z, which may time synchronize with the recent variance 12 and/or the processed signal 16 for presentation to a comparator which may preferably provide at least one of the following upon occasion:

A first condition C1 indicating when one or both of the raw signal and the Z-axis signal is above the raw detect.

A second condition C2 indicating when one or both of the recent variance and the processed signal is above the variance detect.

A third condition indicating when one or both the raw signal and the Z-axis signal is below the raw undetect.

And a fourth condition indicating when one or both of the recent variance and the processed signal is below the variance undetect.

Figure 10B:
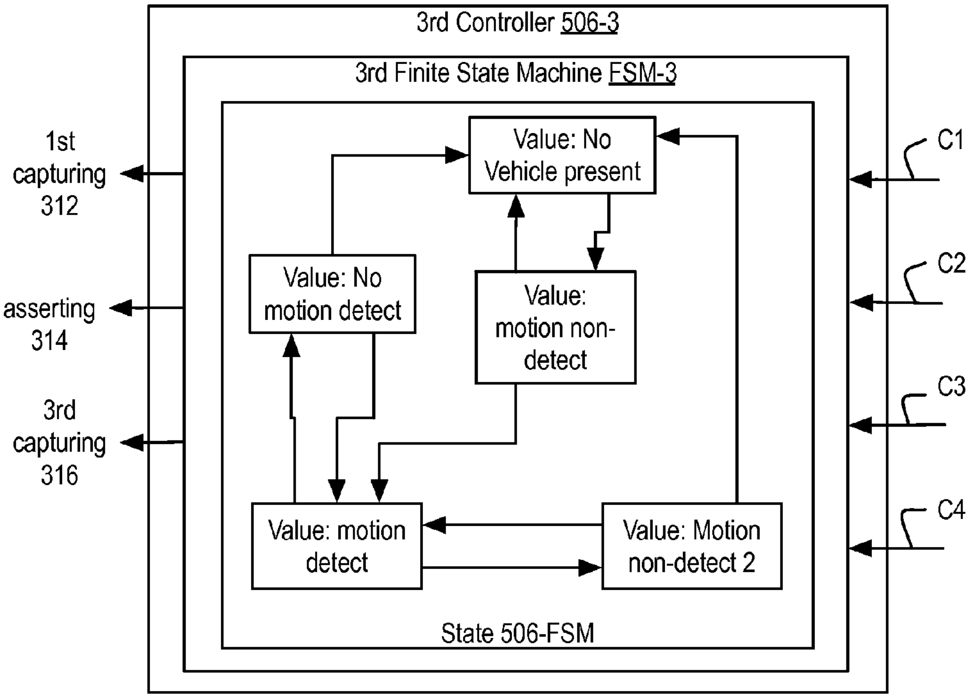
FIG. 10B shows the third controller of FIG. 10A including a third finite state machine receiving four conditions generated by the comparator as inputs, with a state including at least five values, and generating the three outputs of the first capturing, the generating and the third capturing used in the second controller.

These four conditions C1 to C4 may preferably be provided to a third instance 504-3 of a third finite state machine FSM-3, as shown in further detail in FIG. 10B:

The third finite state machine may preferably receive the four conditions generated by the comparator of FIG. 10A, the first condition C1, the second condition C2, the third condition C3, and the fourth condition C4.

The third finite state machine updates and maintains the value of the state 506-FSM, which may preferably include five state values, No-vehicle-detect, motion-non-detect, notion-detect, no-motion-detect, and motion-non-detect-2.

The first capturing 312, and/or the asserting 314, and/or the third capturing 318 may preferably be generated based upon some combination of the four conditions and/or the value of the state.

The value of the state may include a non-redundant representation for each of the five state values shown in FIG. 10B.

At least one of these state values may include a redundant representation, as discussed with regards to FIG. 4E.

In certain embodiments, the third finite state machine may include more than five state values. For example, each of the five state values may have two non-redundant representations, one for its value when the current clock is an even number and the other for its value when the current clock is an odd number.

The preceding embodiments provide examples of the invention and are not meant to constrain the scope of the following claims.

What is claimed is:

1. A method, comprising the steps:

using a raw signal received from a magnetic sensor to create a starting time and an ending time for a vehicle passing near a magnetic sensor, said magnetic sensor is a magneto-resistive sensor stimulated by said motion of said vehicle near said magnetic sensor to create said raw signal, further comprising the steps:

capturing a first time from a current time provided by a clock, when a recent variance of said raw signal crosses above a variance detect;

generating said starting time from said first time when said raw signal crosses above a raw detect and said recent variance of a raw threshold is above said variance detect; and capturing said ending time from said current time when said recent variance of said raw signal crosses below a variance undetect while said raw signal is below a raw undetect.

2. The method of claim 1, wherein the step using said raw signal, further comprises at least one member of the group consisting of the steps:

amplifying a raw magnetic sensor signal further received from said magnetic sensor to create an amplified signal for generating said raw signal;

digitizing said raw magnetic sensor signal with a first analog-to-digital converter to create said raw signal; and digitizing said amplified magnetic sensor signal to create said raw signal.

3. The method of claim 1, wherein said recent variance of said raw signal is a variance of said raw signal over a first time-window for capturing said first time and said starting time; and wherein said recent variance of said raw signal is said variance of said raw signal over a second time-window for capturing said ending time.

4. The method of claim 3, wherein said first time-window is essentially the same time duration as said second time-window.

5. The method of claim 3, wherein said raw signal, includes:

a X-axis signal in a predominant direction of flow for said vehicle's motion;

a Z-axis signal in a direction perpendicular to a pavement said vehicle moves on; and a Y-axis signal in said direction perpendicular to said predominant direction in the plane of said pavement.

6. The method of claim 5, wherein the step capturing said first time, further comprises the step:

capturing said first time when said variance of said first time-window of said Z-axis signal crossing above said variance detect to create said first time;

wherein the step generating said starting time, further comprises the step:

generating said starting time from said first time when said Z-axis signal crosses above a raw detect and said recent variance of said raw threshold is above said variance detect to create said starting time;

wherein the step capturing said ending time, further comprises the step:

capturing said ending time when said variance of said second time-window of said Z-axis signal crossing below said variance undetect while said Z-axis signal is below said raw undetect in said second time-window to create said ending time.

7. The method of claim 6, wherein the step capturing said ending time, further comprises the step:

capturing said ending time when said variance of said second time-window of said Z-axis signal crosses below said variance undetect and when said Z-axis signal crosses below said raw undetect.

8. The method of claim 6, further comprising the steps:

averaging said Z-axis signal to create a moving average signal;

using said moving average signal to create a moving minimum peak signal and a moving maximum peak signal; and subtracting said moving minimum peak signal from said moving maximum peak signal to create a processed signal;

wherein the step capturing said first time, further comprises the step:

first determining said first time when said processed signal crosses above said variance detect while said Z-axis signal is above said raw detect in said first time-window; and wherein the step capturing said ending time, further comprises the step:

second determining said ending time when said processed signal crossing below said variance undetect while said Z-axis signal is below said raw undetect in said second time-window.

9. The method of claim 8, wherein the step averaging said Z axis signal, further comprises at least one member of the group consisting of the steps:

averaging said Z-axis signal over a succession of time windows to create said moving average signal;

low pass filtering said Z-axis signal with a time constant less than one second to create said moving average signal; and weighted averaging using a finite impulse response filter said Z-axis signal to create said moving average signal.

10. The method of claim 9, wherein said succession of said time windows is a succession of non-overlapping time windows.

11. The method of claim 9, wherein said succession of said time windows is a succession of overlapping time windows.

12. The method of claim 9, wherein said time windows in said succession of time windows are all of approximately the same length.

13. The method of claim 9, wherein the step of averaging, further comprises the step of:

averaging at least one sample of said Z-axis signal over at least two of said succession of said time windows.

14. A vehicular sensor node implementing the method of claim 1, comprising:

a processor receiving said raw signal through a communicative coupling to said magnetic sensor to create said start enable and said ending time for said vehicle passing near said magnetic sensor.

15. The vehicular sensor node of claim 14, wherein said processor receiving said raw signal, further comprises:

said processor capturing said first time based upon said variance of said first time-window of said raw signal and based upon said raw signal; and said processor capturing said ending time based upon said variance of said first time-window of said raw signal and based upon said raw signal.

16. The vehicular sensor node of claim 14, wherein said processor includes at least one instance of a controller; wherein each of said controllers receives at least one input, maintains and updates the vale of at least one state and generates output based upon at least one member of the group consisting of: said inputs, and said value of at least one of said states;

wherein at least one of said states includes at least one member of the group, consisting of: a non-redundant digital representation, a redundant digital representation of said non-redundant digital representation, and an analog representation;

wherein said redundant digital representation of said non-redundant digital representation includes at least one member of the group consisting of: a numerically redundant representation, logically redundant representation, and an error controlled representation.

17. The vehicular sensor node of claim 16, wherein said controller includes at least one instance of at least one member of the group consisting of:

a finite state machine, a computer directed by a program system and accessibly coupled to a memory, a neural network, an inferential engine, and an analog component network;

wherein said computer includes at least one data processor and at least one instruction processor; wherein each of said data processors is directed by at least one of said instruction processors; and wherein said program system includes at least one program step residing in said memory.

18. The vehicular sensor node of claim 17, further comprising:

wherein said state represents at least the members of a minimal state group, consisting of: a first state, a second state, a third state, a fourth state and a no-vehicle-present state.

* * * * *